UNITED STATES PATENT OFFICE.

WILLIAM MORRISON, OF CHICAGO, ILLINOIS, ASSIGNOR TO KING UPTON, OF CHICAGO, ILLINOIS.

SECONDARY BATTERY.

SPECIFICATION forming part of Letters Patent No. 717,108, dated December 30, 1902.

Application filed August 5, 1901. Serial No. 70,954. (No model.)

*To all whom it may concern:*

Be it known that I, WILLIAM MORRISON, a citizen of the United States of America, and a resident of Chicago, Cook county, Illinois, have invented a certain new and useful Improvement in Secondary Batteries, of which the following is a specification.

In a common form of secondary battery the active surface of the negative plate is a coating of minimum or red lead in the form of a paste, which in the charge becomes a peroxid of lead. In a negative plate the active surface is a coating of litharge or yellow oxid of lead, which in the charge becomes a porous spongy lead mass. To form the red lead into a paste, it is usually mixed with dilute sulfuric acid or sulfuric acidulated water. This produces a small quantity of sulfate of lead in a supersaturated solution, and in drying the sulfate slowly sets into the mass as it hardens. With this construction, however, when the charging is pressed too far the lead sulfate is changed to a peroxid or binoxid of lead, the sulfuric acid is expelled, and the bond is relaxed until the peroxid coating powders and crumbles away.

The object of the present invention is to overcome this difficulty, and this I have discovered may be accomplished by using fluorin or hydrofluoric acid or fluorid of lead or ammonia or other compounds of lead, which is mixed with the electrolytic solution of the battery, so that in the charge the fluorin being strongly electropositive it seeks the active material or material to become active of the negative plate uniting therewith to resist the destructive effects of overcharging hereinabove referred to and perpetuate the bond of the paste, so as to prevent the latter from crumbling. The advantage of the improvement in increasing the longevity of secondary batteries will thus be apparent.

I claim as my invention—

1. A storage battery, comprising positive and negative plates and an electrolyte in which fluorin is present.

2. A storage battery, comprising a negative plate carrying a paste of minimum, a positive plate carrying a paste of litharge, and an electrolyte in which fluorin is present.

3. A storage battery, comprising positive and negative plates carrying a suitable paste, and an electrolyte in which fluorin is present.

4. A storage battery, comprising positive and negative elements, each element consisting of a support carrying a quantity of suitable paste, and an electrolyte in which fluorin is present.

5. A storage battery, comprising positive and negative elements, each element consisting of a suitable support carrying a quantity of suitable paste, and an electrolyte formed by combining suitable ingredients with hydrofluoric acid.

Signed by me at Chicago, Cook county, Illinois, this 14th day of March, 1901.

WILLIAM MORRISON.

Witnesses:
CHAS. C. BULKLEY,
HARRY P. BAUMGARTNER.